Dec. 27, 1938.    B. BISCHOF    2,141,168
SLIDE VALVE ARRANGEMENT FOR HYDRAULIC GEARS
Filed Dec. 29, 1936    3 Sheets-Sheet 2

Inventor:
BERNHARD BISCHOF
by
ATTORNEYS

Patented Dec. 27, 1938

2,141,168

UNITED STATES PATENT OFFICE 2,141,168

SLIDE VALVE ARRANGEMENT FOR HYDRAULIC GEARS

Bernhard Bischof, Kiel, Germany

Application December 29, 1936, Serial No. 118,067
In Germany January 28, 1936

14 Claims. (Cl. 60—53)

This invention relates to hydraulic gears, and more particularly to an arrangement of the slide valves employed in hydraulic gears of the piston type comprising in principle a pump and a motor, wherein the cylinders are disposed either radially or axially to the axis of the gear and the drive of the pistons takes place by means of wabble discs, eccentrics or other equivalent means. As a result of the action of the pump and the analogous effect of the motor there is produced a circulation of liquid which is distributed or controlled by the slide valves referred to.

In its one application, the invention is intended for hydraulic gears of the character described, in which the pump and the motor are accommodated within a fixed casing, or in separate casings. In gears of this nature the complete output is transmitted purely hydraulically.

The invention, however, may also be applied to hydraulic gears, the pump and motor of which are provided in a rotatable casing, and in which the output of the driving unit (for example, electro-motor, Diesel engine or the like) drives the crank of the pump and the varied output is taken over by the rotatable casing through the medium of toothed wheels, chain transmission or the like, and in which the crank of the motor section is constructed as a stationary element. Such a device is shown for example in applicant's co-pending application S. N. 740,669, filed August 20, 1934. It is, however, also possible in gears of this nature for the rotatable casing to be driven by the electro-motor or the like and the varied output to be taken over by the pump crank, i. e., the reverse of the previous arrangement. In hydraulic gears of this kind a part of the output is transmitted mechanically in direct fashion by torque transmission between the rotatable casing and the pump crank whilst merely the remaining output is transmitted hydraulically (gear with divided transmission).

In gears of both types, i. e., with purely hydraulic transmission as well as in those with divided transmission of the output, there is always provided a pressure chamber and a suction chamber. For controlling the current of liquid between these two chambers it is usual to employ rotary slide valves which accordingly separate the pressure chamber and the suction chamber by reason of their function and during their rotation always cause different passages to be connected with the pressure chamber on the one hand and with the suction chamber on the other hand. Owing to their function these slide valves are subjected to considerable radial load by the liquid, i. e., to strong lateral pressures, and they must accordingly rotate under load in a manner similar to trunnions.

According to the existing state of the art, the slide valves are rigidly connected to the shafts or other parts producing their rotation. Owing to this rigid connection, all inaccuracies in the mounting of these driving parts and the elastic sag of the same caused by the considerable pressures in operation are communicated to the slide valves and seek to move these out of their exact position within the bearing sleeve. These forces, therefore, destroy the tendency of the slide valves to fit exactly into the casing surrounding the same and constituting the bearing sleeve in accordance with the pressure of the liquid acting thereon in a radial direction. A condition of this kind is necessary, however, in view of the fact that the slide valves are required to operate both with very small as well as extremely high circumferential velocity, and because at the same time considerable surface pressures are produced between the slide valve and the bearing sleeve caused by the high pressure of the liquid (80–150 atm.) acting in a lateral direction. The running conditions under which the slide valves rotate in the casing forming their bearing sleeve are, as regards the adjustability and even surface load and the thus favored formation of a wedge of lubricating oil between rotary part and bearing cup or sleeve, the same as in the case of highly loaded sliding bearings. In highly loaded sliding bearings, for the purpose of overcoming these difficulties, measures are adopted relating to the adjustability of the bearing cups in relation to the rotating shaft, consisting for example in the use of spherically mounted bearing cups, divided bearing cup portions capable of rocking about single points (Michell bearing) or the like.

A solution of this kind is impossible for obtaining proper mounting in the case of the rotary slide valves of hydraulic gears owing to the fact that the casing, which also acts as bearing sleeve, must always be a rigid structure on account of the passages conveying the oil.

If the slide valves are rigidly connected to the shafts determining their rotation, it is impossible for these valves to adjust themselves in the sleeve in accordance with the pressure of the liquid acting thereon as set forth in the above. In consequence, the valves are liable to sieze or become wedged. To avoid this, it is accordingly necessary to make the loaded parts of such dimensions that deformation is reduced to a permissible scale. This also necessitates very accurate production of the parts and the provision of very little tolerance, resulting in comparatively high cost of production and in a very high weight of the gear in relation to the output transmitted. Despite all of these measures it is impossible in the case of these slide valves to obtain the same favorable bearing conditions that apply to adjustable slide bearings.

Since liquid under pressure is always present in the interior of the bearing sleeve, the necessity arises for sealing the slide valves or their cylindrical extensions (stubs) at the point at which they are passed through the end wall of the bearing sleeve. The known seals according to the existing state of the art are, however, likewise rigid, and it is accordingly impossible for the slide valves to bear exactly against the wall of the sleeve corresponding to the pressure in operation.

One possible method of arranging the slide valve consists in disposing the same co-axially one behind the other, that they possess substantially a bell-like form and may be moved together to contact with their annular end faces, which represents their normal position of operation, the same forming in this position two chambers, viz., an outer chamber and an inner chamber. These chambers communicate by passages with the cylinders of the pump and the motor. The outer chamber disposed about the outer wall of the slide valves usually acts as pressure chamber, and that within the slide valves as suction chamber, as with this arrangement conditions are favorable for also utilizing the pressure of the liquid for sealing the two slide valves one against the other and against the casing surrounding the same. The slide valves rotate within the casing at speeds which greatly vary between zero and an extremely high maximum. It is frequently the case, particularly in hydraulic gears with divided transmission of the output, that the relative rotation between the slide valves and the rotary gear casing is very small for a comparatively long period of time, and may even approach the zero value, i. e., when the slide valves and the casing have the same or approximately the same circumferential velocity. For this slight rotation a very accurate bearing is particularly important, and this is achieved when the shaft (in this case the slide valve) is able to rest properly in the bearing.

The invention solves in complete fashion the problem of mounting the slide valves in accordance with requirements in the case of hydraulic gears of the kind referred to.

In association with this problem there are also a number of other problems which are likewise solved by reason of the invention.

One of these consists in the fact that the slide valves in the position in which they contact with one another by means of their annular end faces must have the possibility of performing reciprocatory movements in common with one another in the direction of their longitudinal axis, so that no grooves will be formed in the bearing faces and the latter will accordingly remain perfectly smooth. This is important from the point of view of lubrication in order that, despite the high load, a supporting film of lubricant will be formed at all speeds, and also in view of the continuous necessity of sealing the slide valves in relation to the bearing sleeve. During the said reciprocatory movement of the two slide valves it is necessary for these always to remain in perfectly sealed contact with their end faces, as the excess of pressure in the outer valve chamber as compared with the inner chamber, which in the normal state of operation presses the two valves together with their end faces, is not sufficient alone for reliable operation. For this reason there arises the problem of providing, in addition to the hydraulic pressure, mechanical means which hold the slide valves permanently in contact with each other with their end faces, in such fashion that the valves are freely movable in the direction of their axis, this contact of the valves at the same time being capable of being released. Immediately the two valves are separated a free passage for the liquid is formed between the outer pressure chamber and the inner suction chamber. In this position of the slide valves the hydraulic gear is disconnected.

The problem of proper mounting of the slide valves in the bearing sleeve applicable to all conditions of operation, and accordingly of protecting the slide valves against wear, must also take into consideration the conditions arising in the case of frequent sudden connection and disconnection, for example in the operation of cranes.

According to the existing state of the art, the actuation takes place by mechanical means, which always move the same valve in relation to the other in the direction of the longitudinal axis for such time until the two valves touch. This is the coupling operation—for the disengagement the movement takes place in the opposite direction. This known arrangement does not pay consideration to the frictional conditions involved. Upon the movement of the one slide valve in relation to the other throttling resistances are gradually set up between the approaching end faces of the valves, so that the pressure in the pressure chamber of the gear gradually increases. Since at first the casing is stationary, whilst the slide valve serving for the actuation also possesses merely a small speed in the direction of the longitudinal axis, the friction coefficient between the slide valve and its bearing sleeve or casing is to be regarded as friction coefficient of the stationary condition. In view of the considerable hydraulic pressures concerned the displacement of an element of this nature accordingly calls for very large forces and naturally also causes a certain wear of the slide valve. The method employed according to the existing state of the art of performing the actuation by always moving the one slide valve in relation to the other does not solve the problem of proper mounting of the slide valves in the bearing sleeve, causes premature wear of the slide valve used for the engagement or disengagement, and requires for this operation of the slide valve a very considerable force.

An additional problem is associated with the fact that in the case of gears in which the liquid pressures are comparatively high and extremely variable (100 atm. or more) appreciable difficulties are encountered by reason of the known effects of the compressibility of the oil in conjunction with the elasticity of the walls. In this connection the conditions are very similar to those applicable to steam piston engines, which operate with greatly variable steam pressures and in which the inlet and outlet phases of the steam require to be varied in relation to the position of the piston dependent on the tension of the steam. By way of explanation it may be remarked that particularly in hydraulic gears of the piston type operating in the manner referred to, wherein the casing of the gear is set into rotation by a power source and the speed varied by the gear is taken over by a shaft or the like, and in which, therefore, the velocity of the driven shaft varies between zero and a maximum, very different pressures occur.

The subject matter of the invention, which solves collectively the different problems referred to, resides in the use of a special packing or seal between the pressure chamber and the motor or pump casing and of a connection acting as coupling, both the seal as well as the connection acting as a joint which permits radial movement. The said connection is provided between each slide valve, or a spindle rigidly connected thereto, on the one hand and the shaft or other elements determining its rotation on the other hand. The seal and the connection acting as coupling are so constructed that the slide valves are capable of adjusting themselves in the three co-ordinates parallel to their longitudinal axes and at an angle to the shafts or the like which are connected to the same and are subject to elastic deformations or inaccuracies by reason of the mounting.

The arrangement consisting in provision of the said connection acting as coupling between the valve spindle and the elements governing its rotation will be selected in those cases in which the spindle is employed as hollow shaft for conducting oil under high pressure from the pressure chamber of the gear towards the outside, in order to be able rigidly to connect spindle and slide valve whilst avoiding flexible sealing means. If now the spindle is rigidly connected to the slide valve and the said coupling is provided at its opposite end, this spindle represents a long, freely suspended lever which, by reason of its own weight and the weight of the coupling portions connected with the spindle, exerts a tilting moment on the slide valve. In this case there arises the problem of compensating for the effects of the weight and the impulses of the masses acting on the spindle so that these will not propagate to the slide valve and act adversely on its mounting in the bearing sleeve, in which connection it may be remarked that proper mounting of the slide valves constitutes the fundamental problem of the invention.

The invention provides for the requisite compensation of the weight a system of elements acting as a lever and masses constituting a counterweight, the said system being pivotally connected at one point to the gear box or to other fixed parts and at one or more additional points to the spindle of the valve.

Complying with the necessity for being able to move the slide valves into contact with each other, not only by the pressure of the liquid but also by mechanical means, the invention resides in a special construction of a rod mechanism, which braces the two slide valves in relation to one another at their end faces, and in a detachable device, which braces this rod mechanism and is so mounted in a special guide that it is freely movable in the axial direction of the casing, so that the slide valves thus braced are capable as a whole of utilizing the possibility of longitudinal displacement within the bearing sleeve, which is provided by the special coupling forming the joint, for keeping the bearing surfaces continuously smooth by reason of this displacement, consistent with the requirement for proper mounting.

The invention permits of proper mounting of the slide valves also in those cases in which necessity arises for rapid and frequent connection and disconnection. By reason of the relative bracing of the slide valves in accordance with the invention it is accomplished that upon the connection or disconnection there is aways moved that particular slide valve which has the smaller frictional resistance in relation to the casing, in contradistinction to the known arrangements, in which there is aways moved the one valve in relation to the other without consideration to the frictional conditions.

If, for example, the stationary gear is to be set into operation when the motor is running, it is first necessary to move the two slide valves, which are situated apart, into engagement with one another. This is performed mechanically by means of the said bracing device and rod mechanism so that the gap between the end faces of the slide valves gradually becomes smaller, and the throttling resistance in respect of the traversing liquid gradually becomes greater, so that the pressure of the liquid increases in the pressure chamber of the gear. This increasing pressure forces the two slide valves laterally against their sleeves, resulting in friction. This friction may be either friction of movement or friction of the stationary condition, and these friction coefficients, upon the actuation of the gear, are different in respect of each slide valve, since upon starting the pump slide valve is in a state of rotation as compared with the casing. Between the pump slide valve and the casing there is accordingly the smaller friction of movement, whilst at the same period the motor slide valve does not rotate relative to the casing, so that in this case there is the greater friction arising from the stationary condition. The casing is accordingly still stationary. The device according to the invention which braces the two slide valves by means of a rod mechanism is so designed that it tends to move the two slide valves mechanically one towards the other. Since now the one slide valve with the greater friction is securely held, there will always be displaced by the bracing device according to the invention the slide valve having the smaller degree of friction in relation to the casing, viz., the friction of movement. Analogous conditions also occur upon the disengagement. By reason of this behaviour on the part of the slide valves upon the connection and disconnection, in which there is always actuated the more readily movable of the two slide valves, the bearing faces are offered every degree of protection, as the displacement always takes place with the smallest possible friction of movement, whilst according to the previous state of the art there has always been moved the one slide valve in the sleeve irrespective of the frictional conditions involved.

An additional feature of the invention resides in the fact that in the case of hydraulic gears of the piston type in which the outer chamber surrounding the slide valves is employed as pressure chamber the slide valves, which are braced together by means of the said rod mechanism, are so constructed that the shaft stub of the one slide valve, which stub is passed in sealed fashion through the casing surrounding the slide valve and connects the slide valve with its shaft, possesses a larger diameter than the corresponding shaft stub of the other slide valve. This construction of the slide valves in accordance with the invention results in the fact that the pressure which naturally prevails in the pressure space presses the braced slide valves in the direction of the shaft stub having the larger diameter. According to the invention, there is provided as counter-moment against this pressure taking place in the longitudinal direction of the slide valves a spring or other suitable means adapted to produce the requisite counterforce. In this manner it is accomplished that the two slide valves braced together in the manner described must necessarily adjust themselves in different axial positions according to different pressures of the liquid occurring in the gear. Provision is accordingly made in accordance with the invention for employing the slide valves with the shaft stubs of different diameter, the elements (preferably springs) which act in opposition to the pressure of the liquid occurring on one side, and the lever mechanism serving to brace the slide valves, as differential piston.

The provision of the slide valves in the form of a differential piston, so that the two valves are capable of shifting longitudinally in such fashion that certain pressures of the liquid always correspond to a certain lateral position of the slide valves, enables the displacement of the slide valves to be employed for varying the phases at which the liquid commences to flow into the cylinders of the pump and of the motor and ceases to be discharged. A variation of these phases in accordance with the invention takes place by means of lands having inclined control edges provided on the surface of the slide valves.

Various embodiments of the invention are illustrated by way of example in the accompanying drawings.

Figure 1:
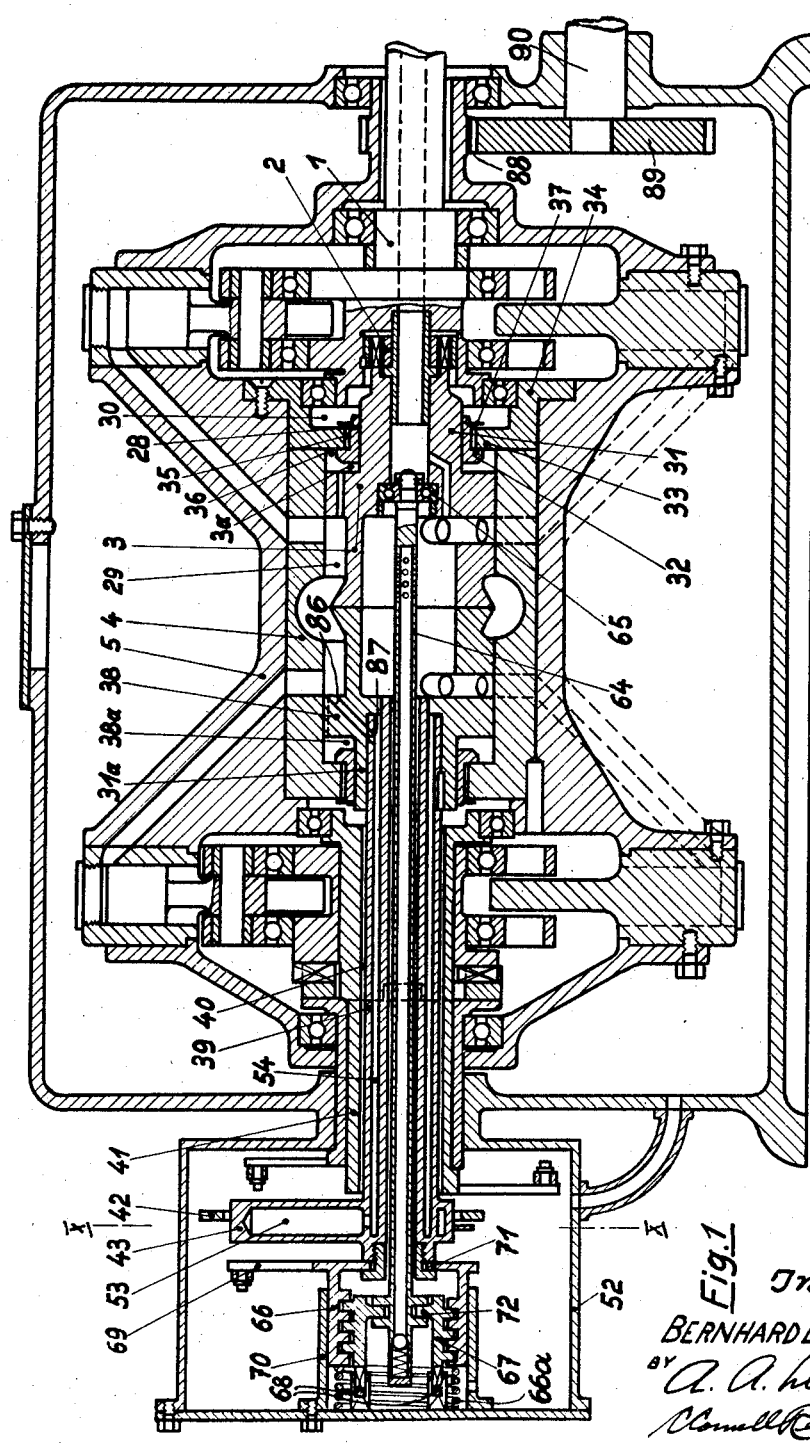
Fig. 1 shows a longitudinal section through the gear.
Figure 2:
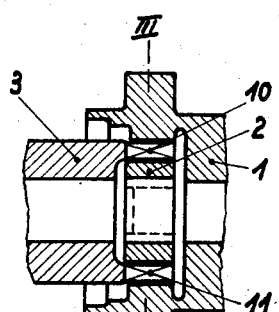
Fig. 2 is a longitudinal section taken through a clutch.
Figure 3:
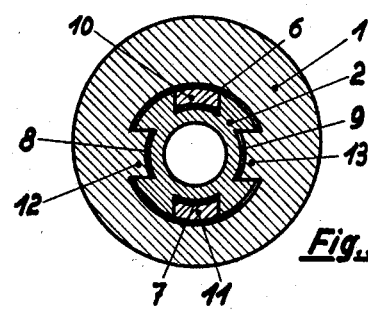
Fig. 3 is a cross-section taken along the line III—III in Fig. 2.
Figure 4:
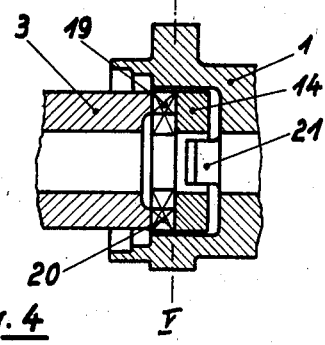
Fig. 4 is a longitudinal section through another form of clutch.
Figure 5:
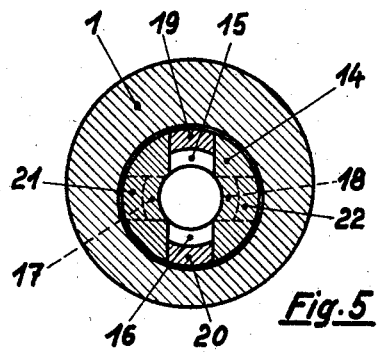
Fig. 5 is a cross-section taken along the line V—V in Fig. 4.

In Fig. 1, 1 is the pump shaft, about which there is disposed the pump cylinder casing with the pistons located therein and the appertaining actuating mechanism. This shaft is connected by means of the clutch 2 with the pump slide valve 3, which turns in the casing 5 containing the bearing sleeve 4. By means of the rotation of the shaft 1, the pistons are given a reciprocatory movement, as a result of which the housing 5 is caused to rotate. This rotation may be transmitted at a different angular velocity ratio, if desired, from the rotary housing 5 through the gears 88 thereon and the gear 89 upon the power delivery shaft 90. Insofar as the functioning of the gear is concerned, the power may be supplied to shaft 90 and delivered via shaft 1. An embodiment of the clutch 2 forming the joint is shown in longitudinal section in Fig. 2 and in cross-section in Fig. 3. It consists of a ring 2, in which there are cut grooves 6, 7, 8, 9. The grooves 6, 7 are engaged by the dogs 10, 11 of the slide valve 3, whilst the grooves 8, 9 are engaged by the dogs 12, 13 on the shaft 1. The dogs fit in the grooves of the ring 2 in correspondingly movable fashion. By reason of this construction of the clutch 2 it is accordingly possible for the pump slide valve 3 to adjust itself in the sleeve 4 in accordance with the dynamic and static pressures of the liquid acting thereon. Another embodiment of the clutch constituting a joint is illustrated in Figs. 4 and 5. This clutch consists of a ring 14, in which there are provided on the one side the grooves 15, 16 and on the other side, at right angles thereto, the grooves 17, 18. The grooves 15, 16 are engaged by dogs 19, 20 on the slide valve 3 and the grooves 17, 18 by dogs 21, 22 on the shaft 1, in correspondingly movable fashion.

Figure 6:
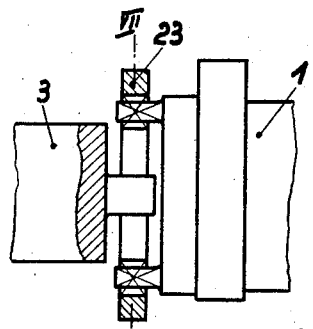
Fig. 6 is a longitudinal section through a third form of clutch.
Figure 7:
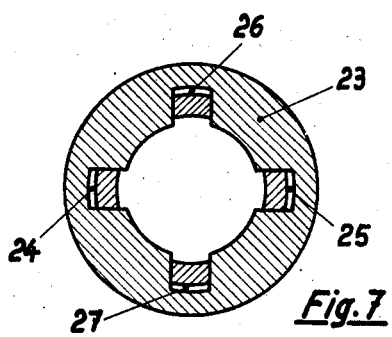
Fig. 7 is a cross-section along the line VII—VII in Fig. 6.

In Figs. 6 and 7 is shown a third form of this clutch 23. In this case the grooves 24, 25 are those which are engaged by the slide valve 3, and 26, 27 those which are engaged by the shaft 1.

The connection acting as clutch and freely movable in all directions may be performed by the aid of a flexible shaft.

The ring 28 in Fig. 1 is the special sealing means between the pressure chamber 29 surrounding the slide valves and the outer chamber 30. This ring 28, ground in sealing fashion on to the shaft stub 31 connected with the slide valve 3, possesses a collar 32, by means of which it bears against a collar 33 of the casing 34. This ring 28 possesses both at 35 as well as 36 a certain clearance in relation to the casing 34 and the bearing sleeve 4, so that the slide valve 3 together with the ring 28 is capable of adjusting itself in any direction in the sleeve 4 in accordance with the pressure of the liquid acting thereon.

Figures 8, 9:
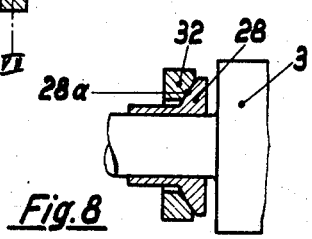
Fig. 8 shows a valve sealing means in the same sectional view as Fig. 1.
Fig. 9 illustrates a further form of valve sealing means in similar sectional view to Fig. 1.

These sealing means may also be constructed in accordance with Fig. 8, in such fashion that the collar 32 is separated from the sleeve 28, and that the sleeve 28 possesses a spherical surface 28a at the point where it bears in sealing fashion against the separated collar. By reason of this measure the sleeve 28 is also adjustable at an angle in relation to the bearing sleeve 4. According to the different embodiments the sleeve 28 is preferably held in such fashion against the casing 34 by a separate ring 37 that the collar 32 firmly connected thereto or separated from the same is able to move only to a small extent away from the projectory collar 33 of the casing 34, so that upon the occurrence of pressure in the space 29 the lateral sealing effect is quickly established, these parts being displaced by the pressure until they bear tightly against each other in sealing fashion.

In accordance with Fig. 9, there may also be fitted between the slide valve 3 and the ring 32 a soft packing, such as a washer 28a, which permits of corresponding adjustment at an angle.

An embodiment of the connection acting as clutch and fitted between a spindle 39 or the like rigidly connected with a slide valve 38 and the parts which determine the rotary movement of the slide valve 38 is shown in Fig. 1.

Figure 10:
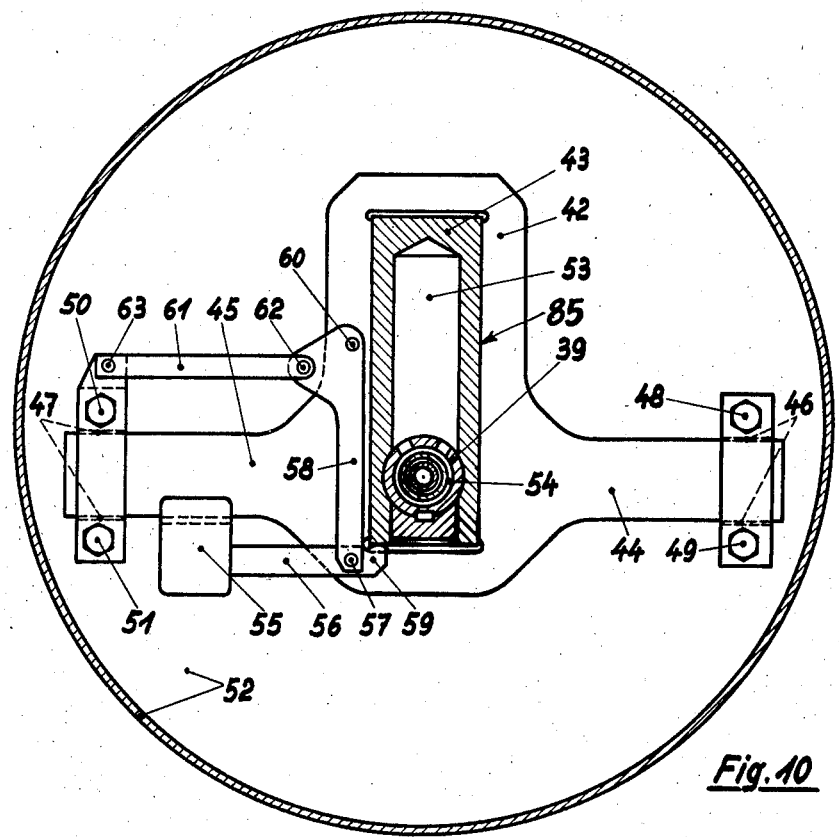
Fig. 10 is a section taken along the line X—X in Fig. 1.

In Fig. 1 there is shown the motor slide valve 38, which is firmly connected to the spindle 39. This spindle 39 is passed with clearance 40 through the motor shaft 41 and is connected at its outer end with the clutch 42, which is also shown in Fig. 10. This clutch 42 is engaged in movable fashion by a member 43 which is firmly connected to the spindle 39, so that the clutch 42 prevents the rotation of the spindle 39, the clutch with the two arms 44, 45 being held by guides 46, 47. It is to be seen from Fig. 10 that the clutch 42 is able to move horizontally and the member 43 vertically in the clutch, so that the spindle 39, and accordingly the motor slide valve 38 rigidly connected thereto, is able to adjust itself freely in all directions in the sleeve 4 in accordance with the pressure of the liquid. The movability between coupling 42 and the part 43 is accomplished by having the contact surfaces 85 of the coupling 42 and of the part 43 formed as relatively movable slideways. Rotation of the clutch 42 is prevented by the fact that the guides 46, 47 are firmly secured to the box 52 by screws 48, 49, 50, 51.

The part 43, which at the outer end of the motor spindle 39 is rigidly connected thereto and prevents rotation of this spindle, may at the same time conveniently be constructed as air chamber 53 for the purpose of compensating the jolts which are caused by the periodic variation of the amount conveyed by the crank drive in pump and motor. This air chamber 53 is in communication with the pressure chamber 29 of the gearing by means of the bore 54 in the spindle 39, the bore 86 in the motor valve 38, and the bore 87 in the valve spindle 39.

The advantage of the embodiment just described consists in the fact that all parts between the pressure chamber 29 of the gear and the air chamber 53 which conduct oil under pressure are rigidly connected with each other, so that every movable packing or seal is avoided. This is important insofar as the passage for the oil from the pressure space 29 of the gear to the air chamber 53, viz., the hollow spindle 39, requires a comparatively large inner diameter, in order that the jolts referred to can propagate from the pressure chamber 29 to the air chamber 53 with the least possible resistance.

A special solution according to Fig. 10 is provided in accordance with the invention for compensating for the weights and jolts acting on the spindle. This consists of the counterweight 55 secured to the lever 56, which is pivotally connected at 57 to the lever 58 and in accordance with the action of the weight 55 bears with a projection 59 against the parts connected with the spindle 39 and thus compensates for their weight. It will be obvious that the counterweight 55 will also compensate for forces of acceleration which act in a vertical direction on the parts connected with the spindle 39. In order also to compensate for forces of acceleration which act on the spindle 39 in the horizontal direction the lever 58 is pivotally connected at the point 60 to the clutch 42, and a rod 61 engages with this lever 58 at the point 62 and is pivotally connected at 63 to the box 52. Jolts acting horizontally on the spindle 39 are compensated for by this lever system in the following manner. A jolt is transmitted to the joint 60 and to the lever 58, which receives a jolt from the opposite side by the counterweight 55, the two jolts being transmitted by way of 62 and 63 to the box 52.

The construction of all clutches in accordance with the invention permits of a free shiftability of the two slide valves in the direction of their longitudinal axis.

An additional feature of the invention relates to a particular method of performing relative bracing of the two slide valves 3 and 38. This consists (Fig. 1) of the rod 64, which is connected in such fashion by the bearing 65 with the pump slide valve 3 that longitudinal forces exerted by the rod 64 can be transmitted by the bearing 65 to the pump slide valve 3. On the other hand, as already stated, the motor slide valve 38 is firmly connected to the spindle 39. The relative bracing of the slide valves 3, 38 takes place, for example, by the fact that with the outer end of the spindle 39 there is connected a nut 66 and with the outer end of the rod 64 a threaded portion 67 adapted to fit into the said nut. The bracing of the two slide valves 3, 38 is performed by rotation of the nut 66 in regard to the threaded member 67 in such fashion that the threaded portion 67, for example, is firmly held by claws 68 and the nut 66 is rotated by means of levers 69.

As shown by Fig. 1, the nut 66 is mounted in the guide 70 to be shiftable in the axial direction. It is also to be seen from Fig. 1 that the transmission of the actuating forces from the nut 66 or threaded member 67 to the spindles 39, 64 takes place by operating members 71, 72 having an annular form, these members having radial clearance in relation to the spindles. This arrangement permits of movement of the spindle 39 at right angles to its axis, there being ensured at the same time the aforesaid adjustability of the slide valves 3, 38 in the bearing sleeve 4.

An additional embodiment of the invention consists in the fact that in the case of hydraulic gears of the piston type, in which the chamber 29 surrounding the slide valves 3, 38 is employed as pressure chamber, the diameter of the shaft stub 31 or 73 (Figs. 1 and 11) of the pump slide valve 3 is smaller than the diameter of the shaft stub 31a or 74 of the motor slide valve 38. In this way the pressure which is exerted by the liquid in the annular hollow space 3a or 75 which communicates with the outer pressure chamber 29, on the pump slide valve 3 is greater than the pressure acting from the annular space 38a or 76 on the motor slide valve 38. In this manner the two slide valves 3, 38, which are braced together, are displaced in the direction of the arrow 77. According to the invention, there is provided for example as counter-pressure source a spring 66a or 78, which engages in suitable fashion at the outer end of the motor slide valve spindle 39.

Figure 11:
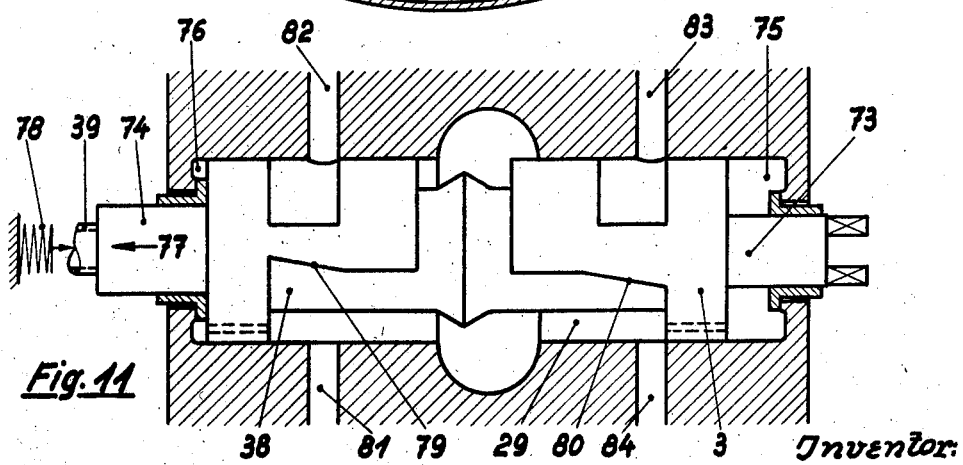
Fig. 11 shows a section through the valve chamber (with the valves in elevation) in an arrangement adapted for very high and variable pressures.

Fig. 11 shows the particular form in accordance with the invention of the control lands 79, 80 on the surface of the slide valves 38, 3. These lands 79, 80 have edges disposed obliquely to the axis of the slide valves. If now by variation of the pressure in the pressure chamber the slide valves are displaced axially and after the displacement accordingly assume a different position, other parts of the inclined control lands cooperate with the control openings in the bearing sleeve. In this way there is regulated the time of closing of the suction and pressure passages 81, 82, 83, 84, which lead to the cylinders of the pump and the motor.

What I claim as new and desire to secure by Letters Patent is:

1. Hydraulic gear of the piston type, comprising in combination a pump, a motor, rotary slide valves which distribute the current of liquid between the said pump and the said motor, at least one slide valve casing acting as bearing sleeve for the said slide valves, members controlling the movement of the said slide valves relative to said casing, elements for each slide valve fitted between the slide valve and the members controlling its movement and so constructed that the said slide valves are capable of moving freely in all directions except rotation in relation to their said bearing sleeve, the said elements serving primarily to ensure proper positioning of the said slide valves.

2. Hydraulic gear of the piston type, comprising in combination a pump, a motor, two substantially co-axially disposed rotary slide valves having a substantially bell-shaped form and being adapted to contact in releasable fashion with one another by means of their annular end faces, a slide valve casing surrounding the said slide valves and acting as bearing sleeve for the said slide valves, members controlling the movement of the said slide valves relative to said casing, elements for each slide valve fitted between the slide valve and the members controlling its movement so as to permit of free movement of the said slide valves in all directions except rotation, parts connected with the one slide valve, additional parts connected with the second slide valve, a releasable bracing device connecting the said parts of each slide valve together and moving together or separating in the direction of their longitudinal axis the rotary valves connected to the said parts, and a guide in which the said bracing device is movably mounted, so that the said slide valves together with the said parts and the said bracing device form a system which is movable as a whole in the direction of the axis of the gear.

3. Hydraulic gear of the piston type, comprising in combination a pump, a motor, two substantially co-axially disposed rotary slide valves adapted to contact with one another by means of their annular end faces, a slide valve casing surrounding the said slide valves and acting as bearing sleeve for the said slide valves, members controlling the movement of the said slide valves relative to said casing, elements for each slide valve fitted between the slide valve and the members controlling its movement so as to permit of free movement of the said slide valves in all directions except rotation, a connecting rod mounted in one of the said slide valves, a hollow spindle rigidly connected to the second slide valve, a bracing device establishing connection between the said connecting rod and the said hollow spindle and comprising a two-part screw mechanism, the one part of which is connected to the said connecting rod and the second part of which is connected to the said hollow spindle, the one part of the said screw mechanism being so connected with a fixed portion outside of the gear proper as to be securely held against rotation, a lever system connected to the other part of the said screw mechanism and adapted to produce relative rotation between the two parts of the said screw mechanism, and a cylindrical guide in which the said screw mechanism is mounted to be shiftable in the direction of the axis of the gear, the said guide being rigidly connected to fixed parts outside of the gear.

4. Hydraulic gear of the piston type, comprising in combination a pump, a motor, rotary slide valves, at least one slide valve casing acting as bearing sleeve for the said slide valves, members controlling the longitudinal movement of the said slide valves, elements for each slide valve fitted between the slide valve and the said members so as to permit of free movement of the said slide valves in the longitudinal direction, shafts adapted to determine rotation of the said slide valves relative to said valve casing, couplings fitted between the said slide valves and the said shafts and so constructed as to permit radial but not rotary relative movement and sealing means fitted between each of the said slide valves and the said slide valve casing, the said sealing means being of such form that each of the said slide valves is permitted to move freely in all directions in relation to the said casing.

5. Hydraulic gear of the piston type, comprising in combination a pump, a motor, rotary slide valves, at least one slide valve casing acting as bearing sleeve for the said slide valves, members controlling the longitudinal movement of the said slide valves, elements for each slide valve fitted between the slide valve and the said members so as to permit of free movement of the said slide valves in the longitudinal direction, shafts adapted to determine rotation of the said slide valves relative to said valve casing, a coupling between each of the said slide valves and the appertaining shaft comprising in substance a ring, guide grooves in the said ring engaged by the slide valve, and additional guide grooves in the said ring at right angles to the said first guide grooves and engaged by the said shaft.

6. Hydraulic gear of the piston type, comprising in combination a pump, a motor, rotary slide valves, at least one slide valve casing acting as bearing sleeve for the said slide valves, members controlling the longitudinal movement of the said slide valves, elements for each slide valve fitted between the slide valve and the said members so as to permit of free movement of the said slide valves in the longitudinal direction, shafts adapted to determine rotation of the said valves relative to said valve casing, and a coupling between each of the said slide valves and its appertaining shaft so constructed and arranged as to permit any relative movement other than rotation between said valves and their respective shafts.

7. Hydraulic gear of the piston type, comprising in combination a pump, a motor, rotary slide valves, at least one slide valve casing acting as bearing sleve for the said slide valves, members controlling the movement of the said slide valves, elements for each slide valve fitted between the slide valve and the said members so as to permit radial but not rotary movement of the said slide valves relative to said controlling members, shaft stubs integral with the said slide valves, sealing means between each of the said shaft stubs and the said casing comprising a packing sleeve adapted to effect sealing in relation to the shaft stubs, an annular beading on the said packing sleeve, and a sealing ring fitted between the said packing sleeve and the said casing, the said ring touching the said casing in a plane at right angles to the axis of the gear and the bearing surface between the said packing sleeve and the said packing ring being constructed as a spherical surface.

8. Hydraulic gear of the piston type, comprising in combination a pump, a motor, rotary slide valves, at least one slide valve casing acting as bearing sleeve for the said slide valves, members controlling the movement of the said slide valves, elements for each slide valve fitted between the slide valve and the said members so as to permit of radial but not rotary movement of the said slide valves relative to said controlling members, shaft stubs integral with the said slide valves, and sealing means between each of the said shaft stubs and the said casing comprising a sealing ring for performing sealing in relation to the said casing and a soft packing for performing sealing between the said ring and the appertaining shaft stub.

9. Hydraulic gear of the piston type, comprising in combination a pump, a motor, rotary slide valves, at least one slide valve casing acting as bearing sleeve for the said slide valves, members controlling the movement of the said slide valves, elements for each slide valve fitted between the slide valve and the said members and permitting of free movability of the said slide valves in relation to the said bearing sleeve, a spindle rigidly connected at the one end to one of the said slide valves, a fixed box surrounding the gear, a coupling between the free end of the said spindle and the said box constructed to form a joint permitting freedom of all movement except that of rotation, elements constituting a lever system and connected at one point with the said spindle and at another point with the said coupling and bearing pivotally at a third point against the said fixed box, and a mass acting as counterweight and connected to the said lever system, the said lever system and the said mass serving to absorb jolts and effects of weight acting on the free end of the said spindle.

10. Hydraulic gear of the piston type, comprising in combination a pump, a motor, rotary slide valves, at least one slide valve casing acting as bearing sleeve for the said slide valves, members controlling the movement of the said slide valves, elements for each slide valve fitted between the slide valve and the said members and permitting of free movability of the said slide valves in relation to the said bearing sleeve, a spindle rigidly connected at the one end to one of the said slide valves, a fixed box surrounding the gear, a prismatic guide rigidly connected to the said spindle, a supporting member having a prismatic groove engaged by the said prismatic guide, guide abutments in the said supporting member at right angles to the said prismatic groove, the said abutments being movable in guides in the said box, and a lever system and counterweight for absorbing the jolts and compensating for the effects of weight acting on the free end of the said spindle.

11. Hydraulic gear of the piston type, comprising in combination a pump, a pressure chamber connected therewith, a motor, rotary slide valves, at least one slide valve casing acting as bearing sleeve for the said slide valves, members controlling the movement of the said slide valves, elements for each slide valve fitted between the slide valve and the said members and permitting of free movability of the said slide valves in relation to the said bearing sleeve, a spindle which is rigidly connected to the one slide valve and contains a passage, an air chamber at the one end of the said spindle communicating through the medium of the said passage with the pressure chamber of the gear, a box surrounding the gear, a coupling constituting a joint permitting freedom of all movement except that of rotation, located between the one end of the said spindle and the said box, and a lever system and weights for absorbing the jolts and compensating for the effects of weight acting on the free end of the said spindle.

12. Hydraulic gear of the piston type, comprising in combination a pump, a pressure chamber connected therewith, a motor, rotary slide valves, at least one slide valve casing acting as bearing sleeve for the said slide valves, members controlling the movement of the said slide valves, elements for each slide valve fitted between the slide valve and the said members and permitting of free movability of the said slide valves in relation to the said bearing sleeve, a spindle which is rigidly connected to the one slide valve and contains a passage, a prismatic guide member which is rigidly connected to the said spindle and contains a hollow space, the said hollow space acting as air chamber and communicating by means of apertures and the said passage in the said spindle with the pressure chamber of the gear, a box surrounding the gear, parts fitted between the said guide member and the said box and forming a coupling which permits freedom of all movement except that of rotation, and a lever system and weights for absorbing the jolts and compensating for the effects of weight acting on the free end of the said spindle.

13. Hydraulic gear of the piston type, comprising in combination a pump, a motor, two substantially co-axially disposed rotary slide valves having a substantially bell-shaped form and being adapted to be moved into contact with one another at their annular end faces, this being their normal position of operation, a slide valve casing surrounding the said slide valves and acting as bearing sleeve for the said slide valves, a pressure chamber surrounding the said slide valves, a suction chamber within the said slide valves, shaft stubs integral with the said slide valves and having different diameters, these diameters being less than the diameter of the slide valves, sealing means between the said shaft stubs and the said casing so that between the said sealing means and the adjacent parts of the said casing and the said slide valves there are formed annular hollow chambers having different diameters, passages connecting the said hollow chambers with the said pressure chamber, a shaft adapted to rotate the one of the said slide valves, a coupling constructed as a joint freely movable in all directions and fitted between the slide valve and the said shaft, a connecting rod connected to the said latter slide valve, a spindle connected to the second slide valve, a releasable bracing device connecting the said spindle and the said connecting rod, a guide in which the said bracing device is movably mounted, a stationary box surrounding the gear, a coupling which permits freedom of all movement except that of rotation fitted between the said spindle and the said box, resilient elements which are supported against fixed parts outside of the gear proper and exerting an axial pressure against one of the said slide valves, so that the said two slide valves braced together by the said bracing device and shiftable in common in the direction of their axis by means of the said coupling constitute a differential piston adapted to adjust itself to different positions dependent on the varying pressures of the oil, and control lands provided in the outer wall of the said slide valves inclinedly to the longitudinal axis of the said gear and so arranged that they vary the phases at which the liquid commences to flow into the cylinders of the pump and the motor and ceases to be discharged therefrom, dependent on the variable tension of the liquid and the longitudinal displacement of the said slide valves thus caused.

14. Hydraulic gear of the piston type, comprising in combination a pump, a motor, rotary slide valves which distribute the current of liquid between pump and motor, at least one slide valve casing acting as bearing sleeve for the said slide valves, parts rigidly connected to each slide valve, members controlling the movement of the said slide valves, elements fitted between the said parts and the said members and so constructed as to permit of free movement of the said slide valves in all directions in relation to the said bearing sleeve, the said elements serving primarily to ensure proper positioning of the said slide valves in the said bearing sleeve.

BERNHARD BISCHOF.